United States Patent [19]
Roth et al.

[11] Patent Number: 5,233,354
[45] Date of Patent: Aug. 3, 1993

[54] RADAR TARGET DISCRIMINATION BY SPECTRUM ANALYSIS

[75] Inventors: Duane Roth; Larry M. Morrison, both of Ridgecrest, Calif.

[73] Assignee: The United States of America as represented by the Secretary of the Navy, Washington, D.C.

[21] Appl. No.: 976,048

[22] Filed: Nov. 13, 1992

[51] Int. Cl.$^5$ .............................................. G01S 13/53
[52] U.S. Cl. .................................. 342/160; 342/162; 342/192; 342/196
[58] Field of Search .................. 342/159, 160, 98, 99, 342/162, 192, 196

[56] References Cited

U.S. PATENT DOCUMENTS

| | | | |
|---|---|---|---|
| 3,287,649 | 11/1966 | Rosenblatt | 328/55 |
| 3,610,901 | 10/1971 | Lynch | 342/196 X |
| 3,732,565 | 5/1973 | Symaniec et al. | 342/110 |
| 3,787,842 | 1/1974 | Thomas | 342/160 |
| 3,795,912 | 3/1974 | Pierce et al. | 342/192 |
| 3,879,729 | 4/1975 | Nevin | 342/161 |
| 4,122,448 | 10/1978 | Martin | 342/174 |
| 4,124,848 | 11/1978 | Clark et al. | 340/524 |
| 4,185,285 | 1/1980 | Bosc | 342/159 |
| 5,168,214 | 12/1992 | Engeler et al. | 342/192 X |

OTHER PUBLICATIONS

M. Hollar, S. Tam, H. Castro, R. Benson; "An Electrically Trainable Artificial Neural Network (ETANN) With 10240 Floating Gate Synapses"; *International Joint Conference on Neural Networks, Washington, D.C.*, Jun. 18–22, 1989 IEEE, Piscataway, NJ.

*Primary Examiner*—John B. Sotomayor
*Attorney, Agent, or Firm*—Stephen J. Church; Melvin J. Sliwka; John L. Forrest, Jr.

[57] ABSTRACT

A method for distinguishing between a target and clutter analyzes frequency components of returned wave energy to detect target energy characterized by being present in a narrow range of frequencies, by increasing in the range over time, or by remaining substantially in the range over time. The method utilizes time sequential spectra of the returned energy. The spectra may be signals from a plurality of band pass filters or may be a spectrogram. The energy in adjacent band pass signals and spectra frequencies are correlated to detect energy in a narrow range of frequencies. Differences in successive spectra are integrated to detect increasing energy in a range of frequencies. An energy peak detected in a narrow range by correlation is integrated to detect that the peak remains in the range. The method is adapted for use with a network having inputs receiving successive samples of the returned energy and having outputs individually connected to the inputs through multiplier elements providing selectable factors, a summing element, and a selectable and generally sigmoidal activation function.

11 Claims, 13 Drawing Sheets

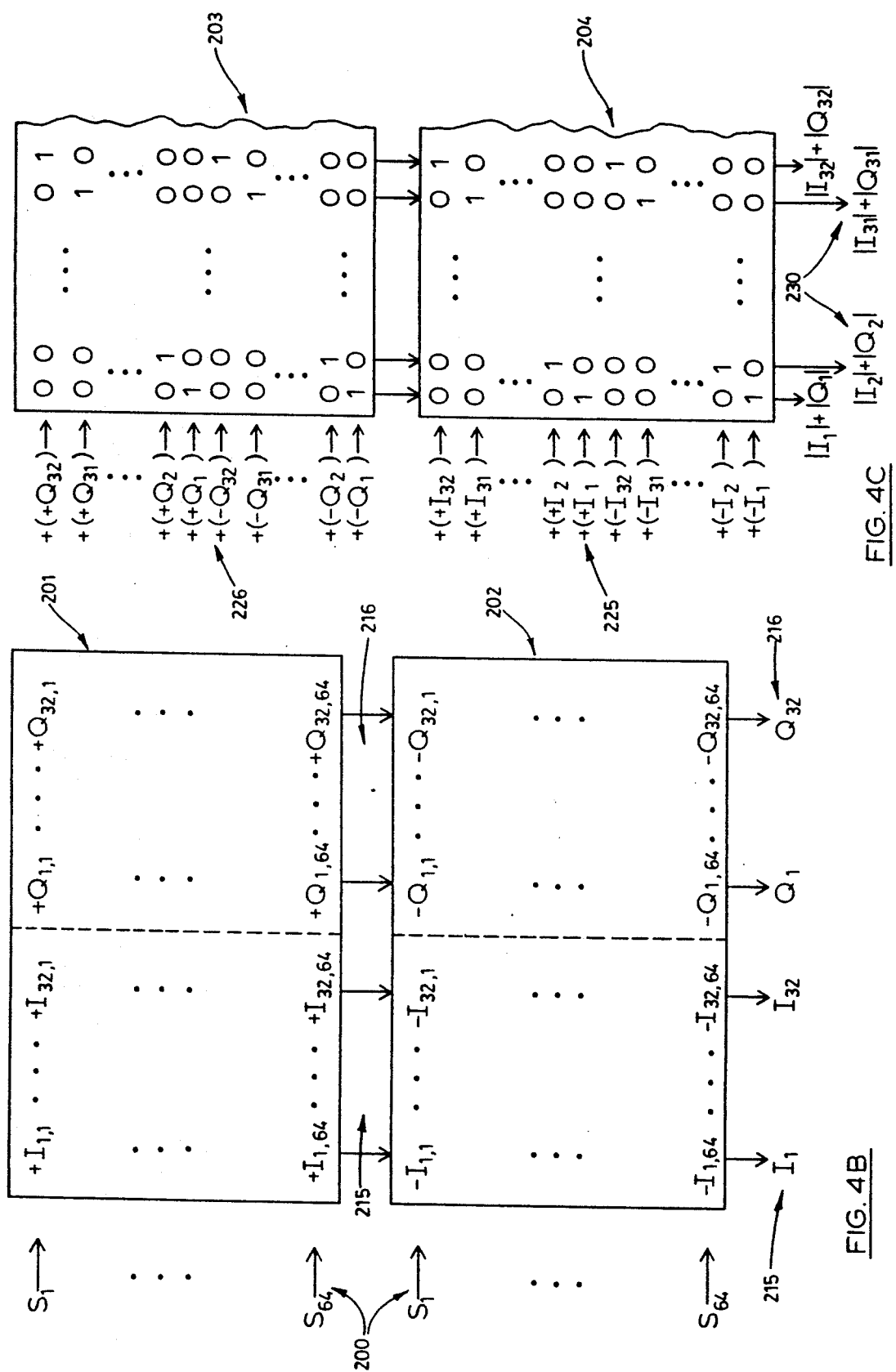

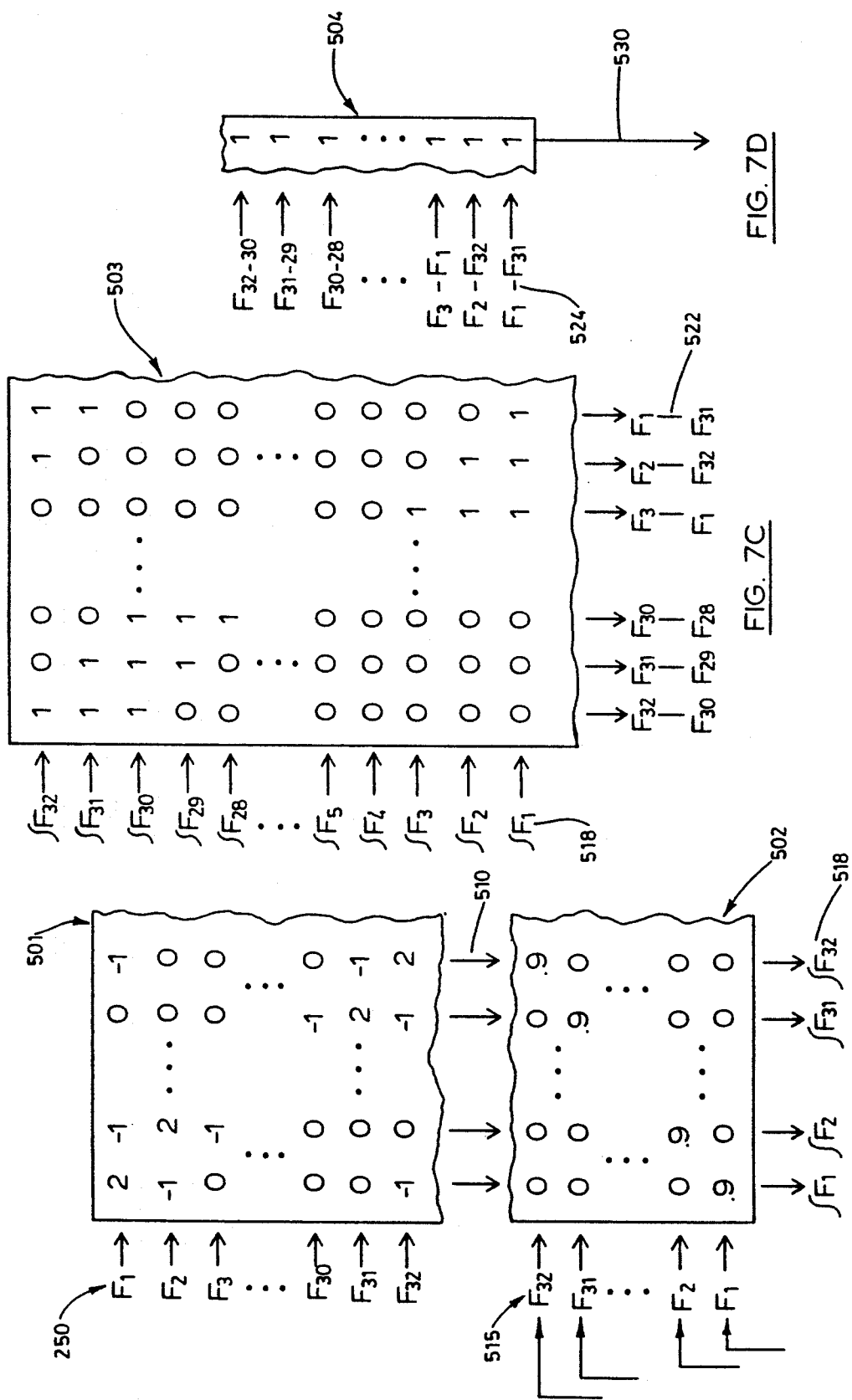

RADAR TARGET DISCRIMINATION BY SPECTRUM ANALYSIS

BACKGROUND OF THE INVENTION

1. Field of the Invention

This invention relates to presence detection systems using reflected wave energy, more particularly to such systems distinguishing a target from clutter by analyzing frequency components of returned energy.

2. Description of the Related Art

It is well-known in signal processing, as for radar, to analyze a plurality of frequency components of reflected wave energy to detect a target. Typically, these frequency components each correspond to a target having a predetermined relative velocity and thus serve to distinguish a target from clutter returns from the sea surface, chaff, and the like having a different relative velocity. However and insofar as the applicants are aware, it is not known to analyze a plurality of the frequency components together and over time to detect predetermined characteristics of the reflected energy associated with a target.

It is well-known to separate the individual frequency components by a plurality of analog or digital "filters" which, for the purposes of the present application, may be defined as providing such components which are continuous analog, bipolar signals at each frequency. It is also well-known to separate the frequency components by a discrete Fourier transform wherein the components represent the relative amplitude of the energy at each frequency. In digital signal processing, well-known methods provide for each desired frequency component a plurality of filter or Fourier coefficients effective at a predetermined sample rate of the reflected energy. The vast number of arithmetic operations required for these methods typically require relatively large processors that are not adapted for use in small vehicles and, although precise, are too slow for certain applications. In radar fuzing for example, a vehicle in the order of 30 centimeters in diameter may be required to detect in milliseconds a target not more than 30 meters away moving at a relative velocity of 2000 meters per second in the presence of chaff and time-varying clutter as from a sea surface as close as the target.

Parallel processors perform vast numbers of arithmetic operations in a relatively short time. Typically, however, such processors are relatively large and complex to program. The development of artificial neural network topology embodied in a single chip is believed to offer an alternative to conventional parallel processors. However, artificial neural network developments are usually focused on "learning" rather than on parallel processing itself so that, insofar as known to the applicants, the prior art does not include specific arrangements using neural network topology for spectral analysis of reflected wave energy.

For the purposes of the present invention, artificial neural network topology may be defined as the topology of a network receptive to a plurality of input signals and generating a plurality of output signals where the network has the following three characteristics: First, a plurality of multiplier elements each corresponding to one of the input signals and to one of the output signals and generating a product signal representing the product of the amplitude of the input signal and a selectable factor individual to the multiplier element. Second, a plurality of summing elements corresponding to one of the output signals and generating a sum signal representing the sum of the product signals corresponding to the output signal. Third, a plurality of activation elements each corresponding to one of the output signals, receiving the sum signal corresponding to the output signal, and generating the output signal in accordance with a selectable activation function of the sum signal. Typically, the activation function used with an artificial neural network is generally sigmoidal or S-shaped with the sum signal being represented by the X coordinates and the output signal being represented by the Y coordinates, the function having a central portion and two asymptotic portions extending along the X axis oppositely of the central portion.

It is known to provide an artificial neural chip having the three above-identified characteristics where the selectablity of the activation function involves the slope of the central portion, the spacing of the asymptotic portions along the Y axis, and the position of the sigmoid in relation to the X axis. When the slope is relatively small and the asymptotic portions relatively closely spaced, the resulting sigmoid approximates a logarithmic curve. Insofar as known to the applicants, the prior art does not include the use of such a selectable sigmoid for spectral analysis.

However, it will be apparent that the existence of compact, fast parallel processors using artificial neural network or other topology together with arrangements for isolating time-varying frequency components in reflected wave-energy, however effective and novel, cannot distinguish between a target and clutter in the absence of specific criteria characterizing such components in energy reflected from the target in relation to those from the clutter.

SUMMARY AND OBJECTS OF THE INVENTION

A method for distinguishing between a target and clutter analyzes frequency components of returned wave energy to detect target energy characterized by being present in a narrow range of frequencies, by increasing in the range over time, and by remaining substantially in the range over time. The method utilizes time sequential spectra of the returned energy and is adapted for use with a network having inputs receiving successive samples of the returned energy and having outputs individually connected to the inputs through multiplier elements providing selectable factors, a summing element, and a selectable and generally sigmoidal activation function. The spectra may be signals from a plurality of band pass filters or may be a spectrogram. The energy in adjacent band pass signals and spectra frequencies are correlated to detect energy in a narrow range of frequencies. Differences in successive spectra are integrated to detect increasing energy in a range of frequencies. An energy peak detected in a narrow range by correlation is integrated to detect that the peak remains in the range.

It is an object of the present invention to provide arrangements for discriminating between wave energy returned from a target and from clutter.

Another object is to provide such arrangements for analyzing a combined target and clutter wave energy return for predetermined frequency characteristics.

Still another object is to provide such arrangements wherein said characteristics involve time sequential variations of frequency components of the combined return.

Yet another object is to provide such arrangements wherein the combined energy may be effectively analyzed for such characteristics in a relatively short time.

A further object is to provide such arrangements adapted for use with artificial neural network topology.

BRIEF DESCRIPTION OF THE DRAWINGS

Other objects, advantages, and novel features of the present invention will be apparent from the following detailed description when considered with the accompanying drawings wherein:

FIGS. 4B and 4C are diagrams showing typical factors used in the network of FIG. 4A;

FIGS. 7B through 7D are diagrams showing typical factors used in the network of FIG. 7A.

DETAILED DESCRIPTION

Neural Network Topology

Figures 1A, 1B:
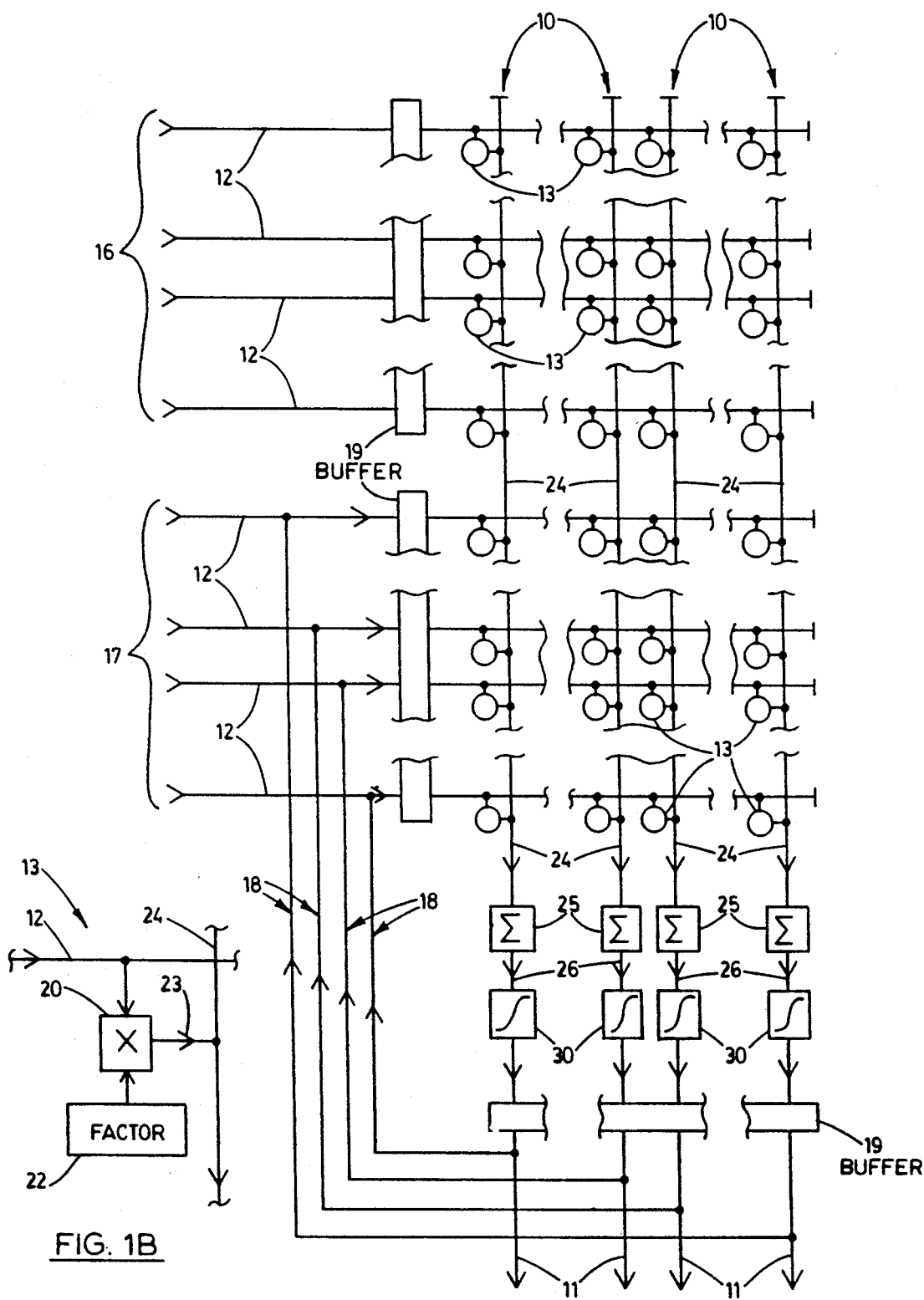
FIG. 1A is a conceptual diagram of an artificial neural network useful in the practice of the present invention.
FIG. 1B is a diagram of a synapse of the network of FIG. 1A.

FIGS. 1A shows an artificial neural network with topology and elements which are typical of those useful in the practice of the present invention and which, typically, are disposed on one integrated circuit chip. The network is constructed in accordance with the prior art and has four "neurons" 10 each providing an output 11 of the network and has eight inputs 12 each connected to each of the outputs 11 through a "synapse" region 13 indicated by a small circle. For illustrative purposes, this network is much simpler than any such network practically useful in the practice of the present invention and having, for example, sixty-four neurons each with one hundred and twenty-eight inputs and synapses. Numerals 14 indicate discontinuities where elements associated with additional inputs and neurons may be connected. For reasons subsequently apparent, the inputs are disposed in two groups 16 and 17, the outputs 11 being fed back to group 17 as indicated by numeral 18. The outputs and each input group are provided with a buffer 19 which may be clocked in any suitable manner, not shown, to retain input and output signals at appropriate times.

FIG. 1B shows one synapse region 13 of the FIG. 1A network, the others being substantially identical. The region has a multiplier 20 receiving the signal associated with an input 12 and a receiving a factor 22 individual to the synapse and selectable in any suitable manner during or after construction of a chip bearing the network. A product signal 23 representing the product of the factor and of the amplitude of a signal on the input 12 is provided to a summing conductor 24 extending through each neuron 10 to a summing circuit 25 thereof. This circuit sums the product signals from all of the multipliers of the neuron and generates a sum signal 26 representing the sum of the product signals of the neuron. It is apparent that the network has plurality of the multipliers 20 each corresponding to a signal on one of the inputs 12 and to a signal on one of the outputs 11 and that the summing elements 24 and 25 each correspond to a signal on one of the outputs 11 and generate a sum signal corresponding thereto. Since the FIG. 1A summing elements 24 and 25 are the same for each such network pair, these elements are only shown in FIG. 1A and not in other figures depicting neural networks. Also, since in each neuron 10 there is a one to one correspondence between the sum of the product signals 23, which is typically the sum signal 26 of the neuron and which in any event determines the output signals 11, the terms "sum signal" and "output signal" are sometimes used hereinafter to refer to the sum of the product signals.

Typically, the factors 22 corresponding to each input group 16 or 17 may be selectively enabled and disabled by suitable signals, not shown, so that the inputs 12 of a disabled group do not affect the sum signals 26 generated by the other group. The FIG. 1 network is thus adapted to function as two networks corresponding to the groups 16 or 17, the two networks time-sharing the summing elements and activation elements and performing recursive operations by appropriate clocking of the buffers and enabling and disabling of the input groups.

Each neuron 10 has an activation circuit 30 which receives the corresponding sum signal 26 and generates an output signal for the corresponding output 11. The output signal is generated in accordance with a predetermined activation function of the sum signal, the function being generally sigmoidal as described above in connection with the related art and being selectable in any suitable manner during or after construction of a chip bearing the network.

Doppler Frequencies of Clutter and Target

Figure 2:
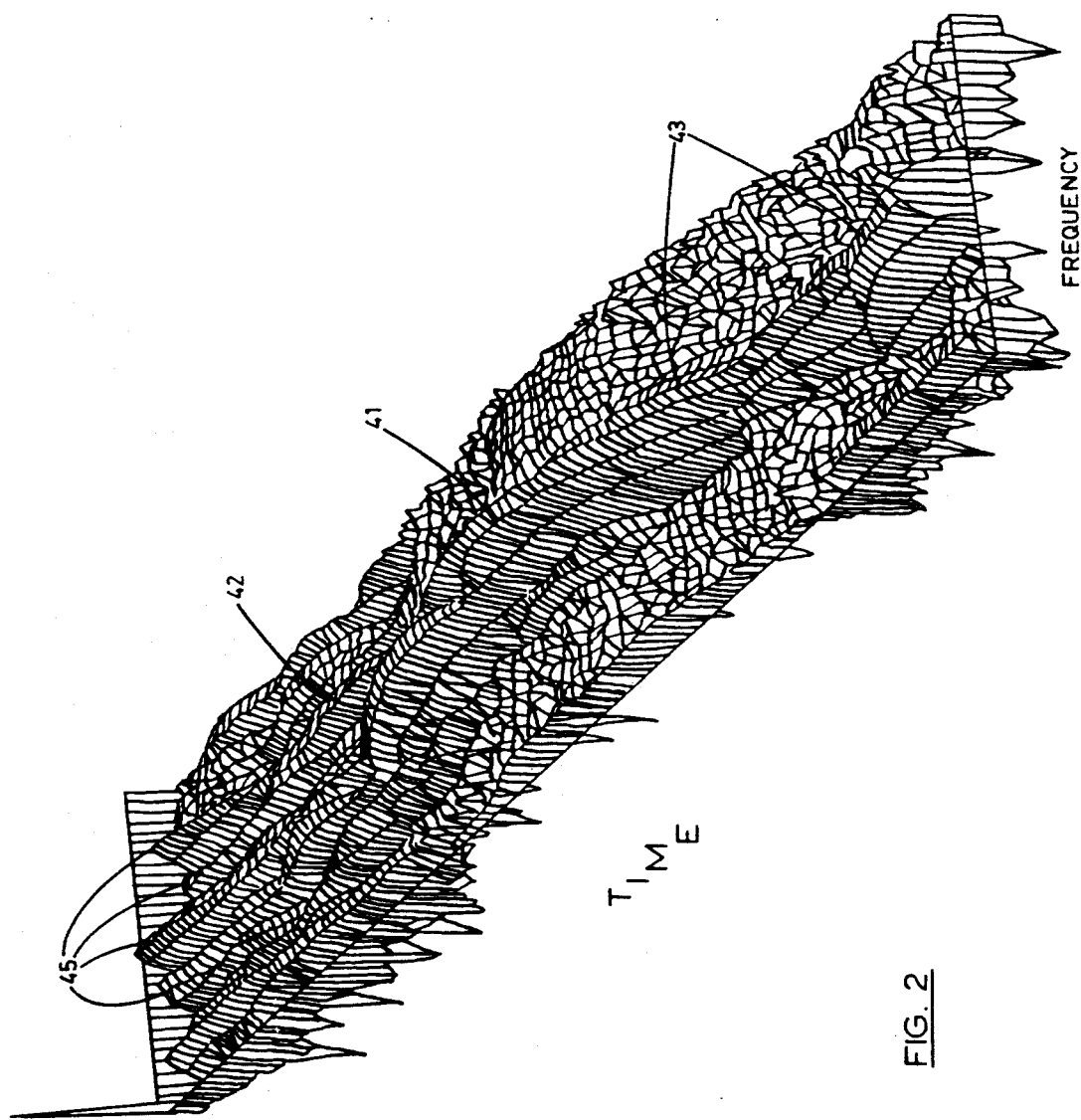
FIG. 2 is a spectrogram of wave energy having frequency characteristics of a target distinguishable by the present invention.

FIG. 2 is a typical spectrogram of doppler frequencies received in combined energy reflected from a target and from clutter as a radar fuze system approaches a target. For purposes of the present application a spectrogram may be defined as a time sequence of spectra where each spectrum represents, for a plurality of bands of frequencies in the spectrum, the amplitude of the energy present in each band as provided by, for example, Fourier transform frequency values corresponding to the bands. Such values are thus frequency components of the combined energy. Other frequency components corresponding to such bands may be provided as bipolar signals corresponding to each band and generated by a plurality of bandpass filters each "tuned" to one of the bands so that such other frequency components represent the instantaneous amplitude of energy in the bands.

FIG. 2 illustrates the discovery of the present applicants that the doppler frequencies of the reflected target energy are distinguished from those of the clutter by three criteria. First, that the target energy is present in a narrow range of frequencies represented by a "ridge" 41. Second, that the energy in this range increases over time as the target is approached and as indicated by the increasing amplitude of the ridge at numeral 42. Third, that the range of the target energy remains substantially constant over time as indicated by numeral 43 in contrast to the movement of clutter energy frequencies indicated by numeral 45.

This discovery of these criteria may be utilized in accordance with the present invention and as subsequently set forth in greater detail by receiving the combined clutter and target energy; generating time sequential frequency components of the energy in any suitable manner, as by the above mentioned Fourier transform or bandpass filters; and analyzing the components for frequencies corresponding to one of the criteria to identify the presence of a target. The definiteness of the target identification may be increased by generating signals corresponding individually to any two or all three of the criteria and detecting the simultaneous presence of the two or three signals in any suitable manner, as by an AND gate or with an artificial neural network as subsequently described.

Figure 3A:
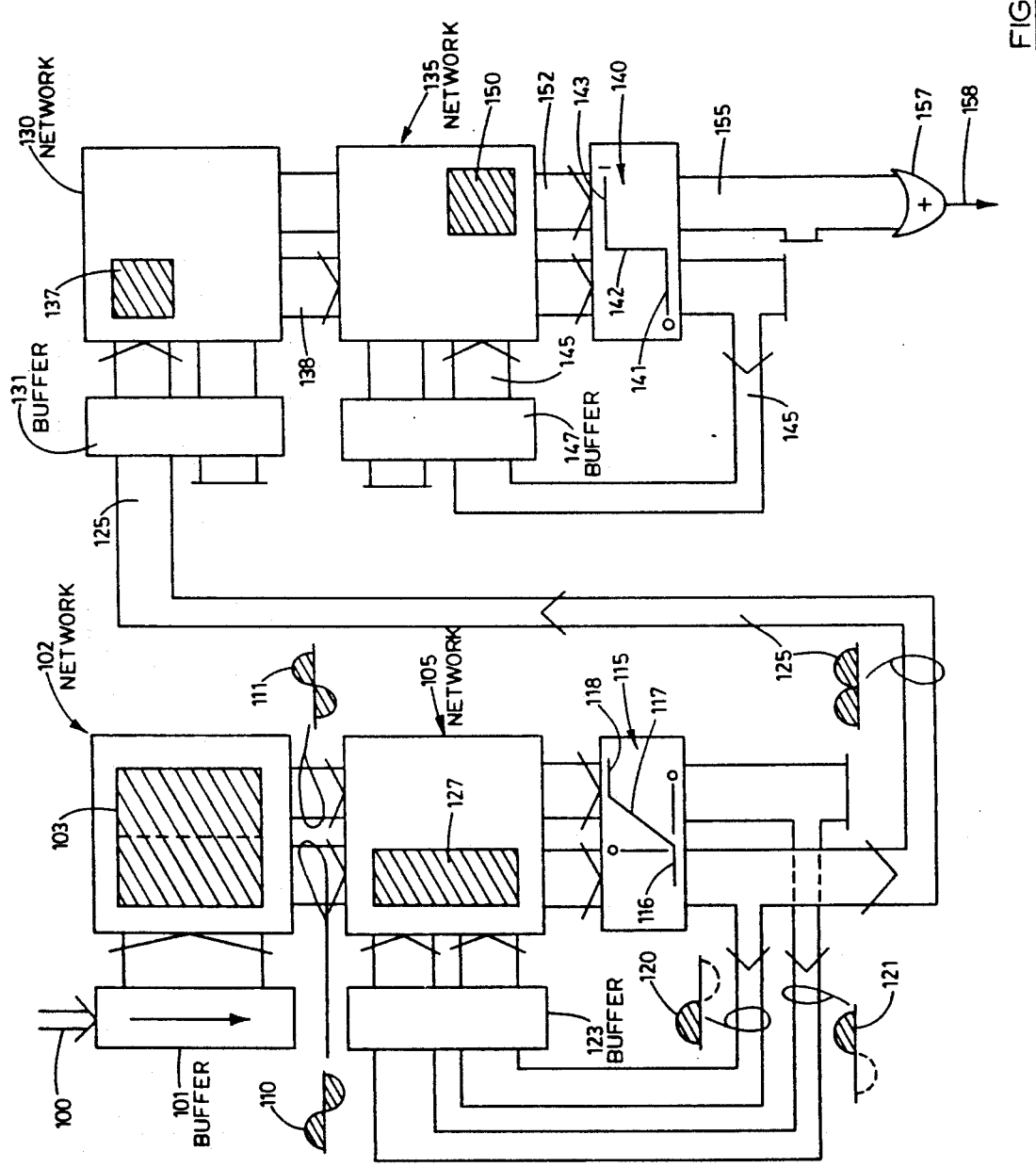
FIG. 3A is a diagram of a multiple artificial neural network providing bandpass filtering for distinguishing a target in accordance with a first criterion of the present invention.

Distinguishing a Target by Spectral Width using Bandpass Filtering and Rectification by Neural Network FIG. 3A shows a multiple artificial neural network functioning in accordance with a method of the present invention. This network continuously receives a predetermined number of samples as indicated by numeral 100 in FIG. 3A and by "$S_1$" through "$S_{64}$" in FIG. 3B. The samples are continuously generated from combined target and clutter wave energy sampled at any suitable and predetermined rate and represent successive amplitudes of the combined energy. The samples are provided, as inputs through a buffer 101, to a first network 102 wherein the factors of the all of the multiplying elements, as indicated by shaded area 103 in FIG. 3A, are coefficients of bandpass filters for a plurality of frequency components in the combined energy. First network 102 is depicted as corresponding to network elements associated with first input group 16 in FIG. 1, the FIG. 3A multiple network also having a second network 105 corresponding to such elements associated with second input group 17. Networks 102 and 105 thus share summing and activation elements. However, it will be apparent that networks 102 and 105 and similar network pairs subsequently depicted may have their own summing and activation elements.

Figures 3B, 3C:
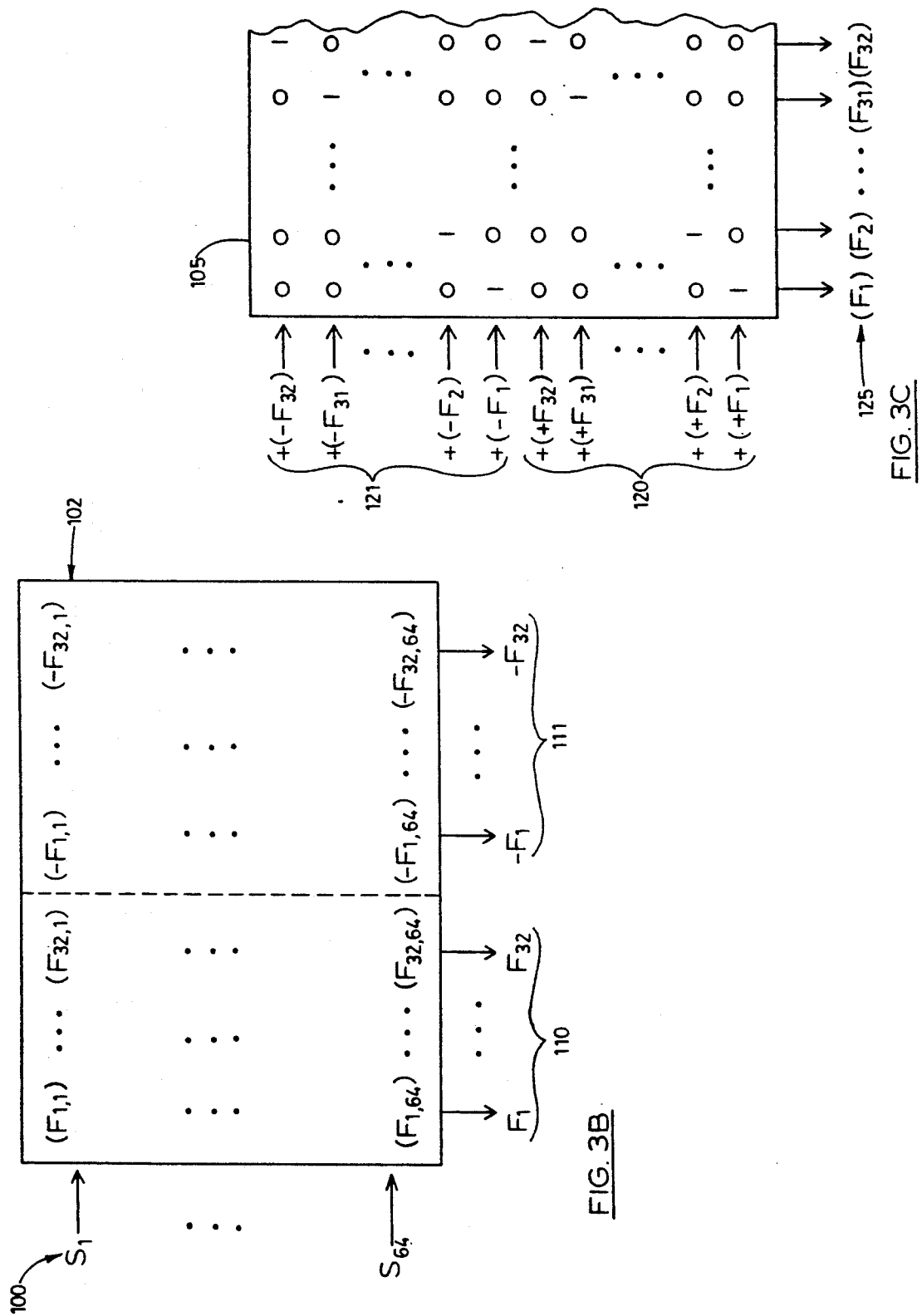
FIGS. 3B through 3E are diagrams showing typical factors used in the network of FIG. 3A.

The factors in area 103 for a first half of the output signals, which correspond to signals 11 of FIG. 1 and thus to their associated sum signals 24 and which are identified in FIG. 3B by "$F_1$" through "$F_{32}$", are well-known bandpass filter coefficients calculated in any suitable manner for the desired frequencies of the components and the sample rate and thus effective to select predetermined frequency components of the combined target and clutter energy. These coefficients are shown in parenthesis and indicated by double subscripts "$1,1$" through "$32,64$" where the first subscript indicates a frequency component and the second indicates a filter coefficient for that component. The factors for a second half of the output signals corresponding to "$-F_1$" through "$-F_{32}$" have the same magnitudes as the corresponding factors for the first half of the signals but are opposite in sign. The filter coefficients for each frequency are thus provided in pairs, each pair operating on the same one of the samples. As a result of these factors and with second network 105 disabled, the first half factors for each frequency component generate a sum signal, such as that indicated in FIG. 3A by numeral 110, representing a frequency component of the combined energy. It is evident that sum signal 110 is the inverse of a sum signal indicated by numeral 111 and generated by the second half factors for the same frequency component.

The activation functions for the pair of networks 102 and 105 are selected, as indicated by numeral 115, so as to generate an output signal corresponding to zero when the corresponding sum signal is below a zero value and corresponding directly to the sum signal when the sum signal is above a zero value. This activation function is a sigmoid having a first asymptotic portion 116 at the zero level and a substantially linear central portion 117 extending from the portion 116 to another asymptotic portion 11 which is not involved in target distinguishing function of the FIG. 3A multiple network. It is apparent that function 115 results in an output signal corresponding to a predetermined range of the sum signal with sigmoid linear central portion 117 disposed in the range. It will be subsequently apparent that function 115 and other sigmoidal functions described below generate such output signals representing frequency components of the combined target and clutter energy in predetermined forms for analysis to detect predetermined frequency characteristics such as those described above in connection with the doppler frequencies of clutter and target. For illustrative convenience, only the one activation function 115 is depicted in FIG. 3A and in subsequent figures for each network pair since, in the practice of the present invention as described in the present application, the activation functions for all of the output signals of a network are substantially identical.

As a result of the operation of activation function 115 on the inverse signals typified by signals 110 and 111, the negative portions of these signals are suppressed resulting, respectively, in output signals typified by those indicated by numerals 120 and 121 and fed back, typically as indicated by numeral 18 in FIG. 1, to an input buffer 123 for network 105 That is, the output signals of first network 102 represent only the positive portions of sum signals thereof as represented in FIG. 3C by "$+(-F_{32})$" through "$+(-F_1)$" and "$+(+F_{32})$" through "$+(+F_1)$". It is evident that each fed back output signal pair, which corresponds to one of the above-described pairs of the filter coefficients having the same magnitude and opposite sign, represents the absolute value of the amplitude of each frequency component. Buffer 123 is successively clocked at appropriate times to receive signals 120 and 125 generated as outputs of network 102. It is apparent that, whenever buffer 123 is clocked, this buffer receives a sample of signals 120 and 121 and that each such sample is a set of time sequential frequency components of the combined target and clutter energy.

Figures 3D, 3E:
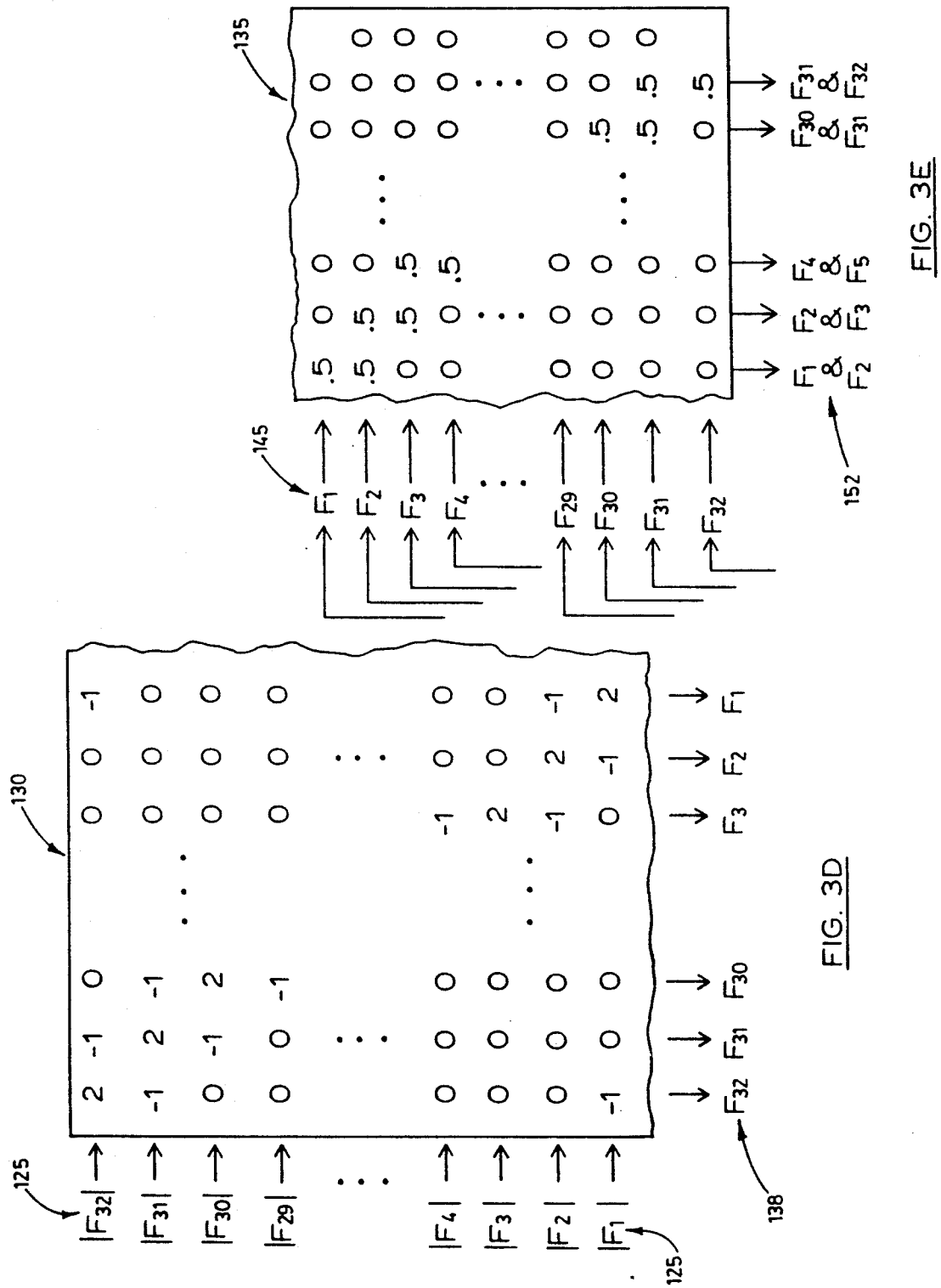

With first network 102 disabled, the fed back output signals are summed by network 105 so as to generate output signals 125 which correspond to rectified frequency components generated by bandpass filters and which are identified in FIGS. 3C and 3D by "$|F_1|$" through "$|F_{32}|$". For this purpose, there are used only the multiplying element factors disposed, typically and conceptually, in one half of network 105 as indicated by shaded area 127, such factors in the unshaded half of network 105 and unshaded portions of other networks subsequently described being set effectively to zero. The above-identified first half of the output signals of the first network, signals 120, are provided as a first set of the fed back input signals to the second network, and the above-identified second half of the output signals of the first network, signals 121, are provided as a second set of the fed back input signals to the second network. As shown in FIG. 3C, the factors of network 105 associated with the one of the signals 120 and the one of the signals 121 corresponding to the same frequency component and also corresponding to the same output signal are selected to have the same value, this value being typified by "1's"; and the other factors are set to an effectively zero value. As a result, only the pair of signals 102 and 121 corresponding to the same frequency component are summed and thus generate the absolute or rectified value of the frequency component.

It is evident that the elements of FIGS. 3A and 3B so far described function as a plurality of bandpass filters corresponding to different bands of possible doppler frequencies in the combined target and clutter energy and providing the frequency components of this energy as, in effect, continuous bipolar signals corresponding to each component and indicated by numeral 110 and 111 as the outputs of network 102. Each of these outputs is rectified by the activation function 115 and second network 105 to generate the signals 125 consisting of rectified frequency components of the combined energy. Signals 125 are provided from second network 105 to a third network 130 of the FIG. 3A multiple network for analysis of successive such rectified components to detect a target in accordance with a predetermined criterion. Signals 125 are received by a buffer 131 for network 130, this buffer being successively clocked to sample signals 125 generated as outputs of networks 102 and 105. It is apparent that each sample of signals 125 by buffer 131 is a set of time sequential frequency components of the combined energy. It is also apparent that signals 125 are provided by the combined networks 102 and 105 in the rectified form to network 130 for such analysis.

Third network 130 is depicted as corresponding to network elements associated with input group 16 in FIG. 1. The FIG. 3A multiple network also has a fourth network 135 corresponding to such elements associated with second input group 17. In network 130 the factors of the multiplying elements receiving signals 125, which are frequency components in the form of rectified bandpass filter outputs, are predetermined correlation coefficients or factors selected to correlate such components of each group of three adjacent frequency bands to detect peak amplitudes at the center band of each group for detection of target energy present in a narrow range of frequencies represented as described above, the correlation filters being selected to correlate the amplitude of the center band with the amplitudes of adjacent such bands to emphasize a peak amplitude at the center band. These network 130 factors are shown in FIG. 3D and, typically and conceptually, are disposed in network 130 as indicated by shaded area 137 in FIG. 3A so as to provide output signals indicated by numeral 138 in FIG. 3A and by "$F_{32}$" though "$F_1$" in FIG. 3D.

Referring further to FIG. 3D, it is seen that the factors corresponding, for example, to the column above the one output signal "$F_{31}$" and to the three input signals "$|F_{32}|$"—"$F_{30}$" are, in respect to these input signals, "$-1$", "2", and "$-1$". The other factors for this output signal are effectively zero. The three non-zero factors detect a peak in the $F_{31}$ frequency band with, in effect, a positive-going slope in the $F_{32}$ band and a negative-going slope in the $F_{30}$ band so that these three factors are a correlation for an amplitude peak for the $F_{31}$ frequency band and thus select such a peak in the input signals 125. The same three factors, "$-1$", "2", and "$-1$", are disposed in the other FIG. 3D columns so as to perform the same correlation on the other frequency bands. It is evident that the frequency peak correlation characteristic of the plurality of frequency components represented by the three input signals "$|F_{32}|$—"$|F_{30}|$" is revealed by selecting the factors corresponding to these three signals and to the one output signal $F_{31}$ as correlation factors for this characteristic so that this one signal represents the correlation for the frequency component corresponding to signal $F_{31}$.

The signals 138 are provided to an activation function 140 for networks 130 and 135, this function being a signum or step function. Function 140 provides for each signal 138 a first asymptotic portion 141 at a first level, typically a binary "0", when the signal is below a predetermined threshold 142 and a second asymptotic portion 143 at a second level, typically a binary "1", when the signal is above the predetermined threshold. It is apparent that, for each one of the signal 138 frequency bands, function 140 determines the presence of target energy present at a predetermined amplitude in the center band of three adjacent bands and thus selects such an amplitude for detection by network 135. The, in effect, binary signals generated by function 140 are indicated by numeral 145 and by "$F_1$" through "$F_{32}$" in FIG. 3E and are fed back to network 135 through an input buffer 147.

In fourth network 135 the factors of the multiplying elements receiving signals 145 are selected to detect the presence of a peak for two adjacent frequency component bands corresponding to those of signals 125 and 138. These network 135 factors are shown in FIG. 3E and, typically and conceptually, are disposed as indicated by shaded area 150 in FIG. 3A so as to provide output signals indicated by, numeral 152 and by "$F_1$ & $F_2$" through "$F_{31}$ & $F_{32}$" in FIG. 3E. It is seen in FIG. 3E that the factors corresponding, for example, to the column above the one output signal "$F_1$ & $F_2$" and to the two input signals "$F_1$" and "$F_2$" are both "0.5", the other factors for this output signal being effectively zero. These two non-zero factors result in the output signal being less than "1.0" unless both of the input signals are above the threshold level provided to signals 145 by function 140. Pairs of the 0.5 factors are similarly arranged for each of the other pairs of signals 145 so that each of the signals 152 attains an, in effect, binary 1 level to indicate that a corresponding pair of adjacent frequency components have the peaks detected by the correlation effected by network 130.

It is apparent that detection of the frequency characteristic of the presence of a peak for two adjacent frequency component bands involves the sum of a plurality of signals, such as signals "$F_1$" and "$F_2$", from a first network, network 130. This detection includes selecting, in a second network 135, the factors of each multiplier element that correspond to the plurality of signals from network 130 and to one of the sum or output signals from the second network, such as signal "$F_1+F_2$" of the signals 152, so that the plurality of signals are provided for summing as the one of the output signals. It is further apparent that the 0.5 factors are selected so that the sum signal is within a predetermined range, namely less than 1.0, corresponding to the range of the signals 145 from network 130 after application of activation function 140 to signals 138.

After the summation by network 135, signals 152 therefrom are provided to function 140 which provides corresponding output signals 155 to an OR gate 157 having a single output 158 which provides a binary 1 signal when a target is distinguished by the method using bandpass filters and carried out by the multiple network of FIG. 3A.

Discrete Fourier Transform by Neural Network

Figure 4A:
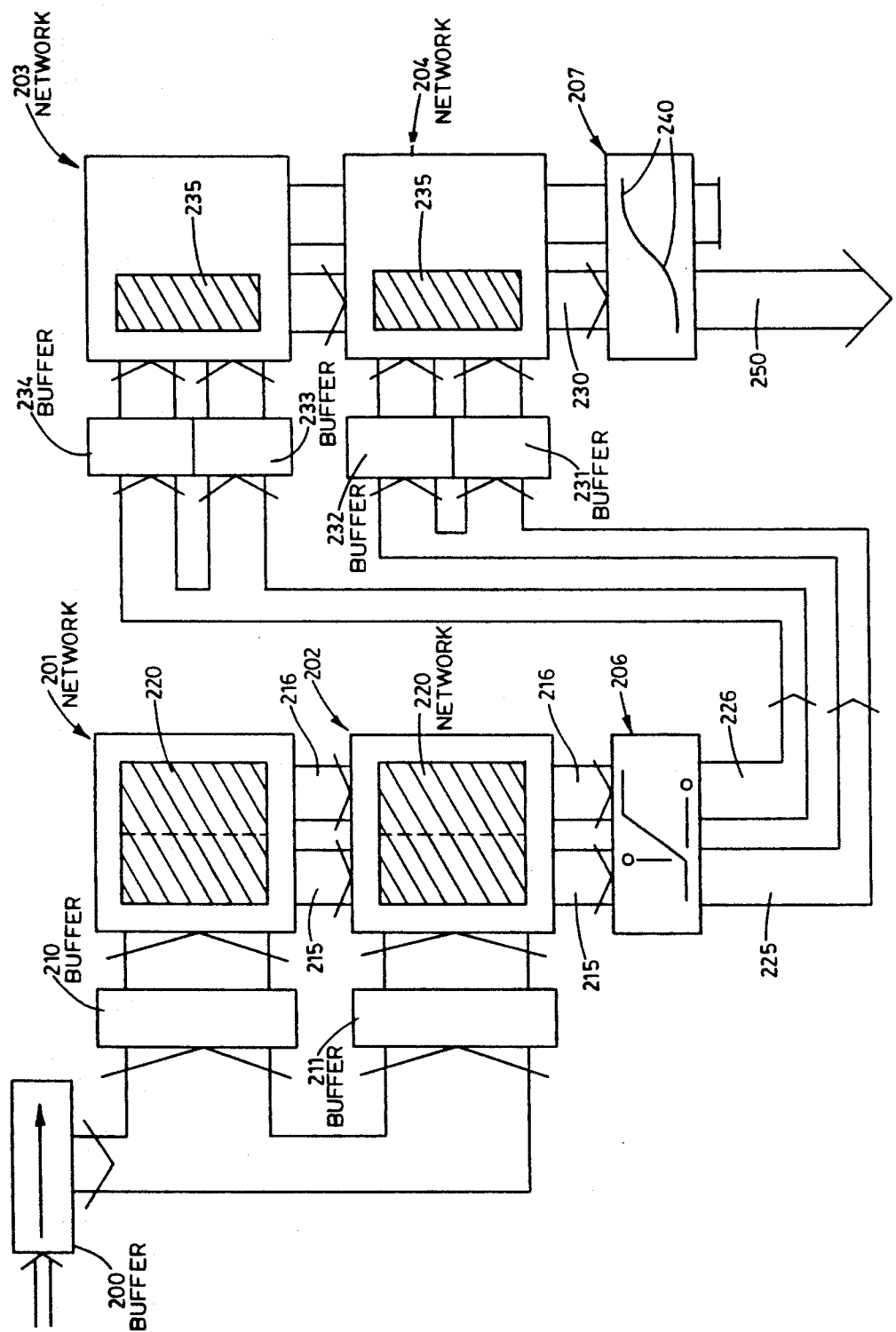
FIG. 4A is a diagram of a multiple artificial neural network generating a discrete Fourier transform in accordance with the present invention.

FIG. 4A shows a multiple artificial neural network for generating, in accordance with the present invention, successive approximate, discrete Fourier transforms forming a spectrogram wherein the spectra provide time sequential frequency components of combined target and clutter energy. The spectrogram is adapted for analysis to detect frequency characteristics distinguishing the target energy from the clutter energy by the above described three criteria. However, a spectrogram so generated may be used for other purposes.

The FIG. 4A multiple network is similar to that of FIG. 3A in continuously receiving, as indicated by numeral 200, a predetermined number of samples of the combined energy, the samples being continuously provided at any suitable and predetermined rate and representing successive amplitudes of the combined energy. The FIG. 4A multiple network is also like that of FIG. 3A in having a first network 201, a second network 202, a third network 203, and a fourth network 204 disposed in pairs with the first and second networks having an activation function 206 and the third and fourth networks having an activation function 207. However, the FIG. 4A networks do not use feedback from the activation functions to the preceding network, and networks 201 and 202 may be considered as functioning together as a first network, and networks 203 and 204 may be considered as functioning together as a second network.

Samples 200, which are identified in FIG. 4B by the pairs of indicia "$S_1$" through "$S_{64}$", are provided as a first set of inputs to network 201 through a buffer 210 and are provided as a second set of inputs to network 202 through a buffer 211. Networks 201 and 202 may be considered as having first half output signals, which are indicated by numeral 215 and by "$I_1$" through "$I_{32}$" in FIG. 4B, and second half output signals, which are indicated by numeral 216 and by "$Q_1$" through "$Q_{32}$".

Networks 201 and 202 are provided with multiplier factors which are selected as well-known discrete Fourier transform coefficients calculated in any suitable manner for desired frequency components in the combined energy and for a desired sample rate so that the factors are effective to select predetermined frequency components of the combined target and clutter energy. Typically and conceptually, these factors utilize all of the multiplying elements of both networks as indicated by shaded areas 220 in FIG. 4A. The factors for network 201 corresponding to the buffer 210 first set of inputs and to first half output signals 215 are the usual in-phase coefficients of the Fourier transform as indicated in FIG. 4B by "$+I_{1,1}$" through "$+I_{32,64}$" where the subscripts identify each of thirty-two frequency components and sixty-four Fourier coefficients for each frequency. The factors corresponding to each of the output signals $I_1$ through $I_{32}$ are thus Fourier coefficients for a predetermined one of the frequency components so that the FIG. 1 sum signal 26 corresponding to such an output signal represents the amplitude of energy present in the combined energy at the frequency component during the predetermined number of samples 200.

The factors of network 202 corresponding to the buffer 211 second set of inputs and to the first half output signals have the same magnitude as those factors corresponding to the network 201 first half output signals, but are opposite in sign and are thus identified by in FIG. 4B by "$-I_{1,1}$" through "$-I_{32,64}$". The factors of network 201 corresponding to the buffer 210 first set of inputs and to second half output signals 216 are the usual quadrature coefficients of the Fourier transform and are identified by in FIG. 4B by "$+Q_{1,1}$" through "$+Q_{32,64}$" The factors of network 202 corresponding to the buffer 211 second set of inputs and to the second half output signals have the same magnitude as those factors corresponding to the network 201 second half output signals, but are opposite in sign and identified by in FIG. 4B by "$-Q_{1,1}$" through "$-Q_{32,64}$".

As a result of the network 201 and 202 Fourier coefficients of opposite sign and with one network 201 or 202 disabled as described above, the factors for each frequency component result in a sum signal, corresponding to a FIG. 1A signal 26, which is the inverse of the sum signal resulting for the same frequency component when the other network is disabled. To provide the positive one of these sum signals, activation function 206 for networks 201 and 202 is selected to be substantially identical to function 115 in FIG. 3A so that as a result of the operation of function 206 on the signals 215 and 216 the negative portions of these signals are suppressed. As a result, each pair of output signals 215, one signal from network 201 and one from network 202, that correspond to a pair of in-phase coefficients having the same magnitude, for example the coefficient pair "$+I_{1,1}$" and "$-I_{1,1}$", represent the absolute value of an in-phase frequency component of the discrete Fourier transform. Similarly, each pair of output signals 216 from these networks corresponding to a pair of quadrature coefficients having the same magnitude, for example the coefficient pair "$+Q_{32,64}$" and "$-Q_{32,64}$", represent the absolute value of a quadrature frequency component of the discrete Fourier transform.

However and in a network like the FIG. 4A multiple network, these output signal pairs are, typically, generated at different times by successively enabling and disabling networks 201 and 202 so that a signal 225 corresponding to the "I" components first provides values corresponding to the "+I" Fourier coefficients and then provides values corresponding to the "−I" Fourier coefficients. Similarly, a signal 226 corresponding to the "Q" components first provides values corresponding to the "+Q" Fourier coefficients and then provides values corresponding to the "−Q" Fourier coefficients. The signals 215 and 216 positive portions, which are present in signals 225 and 226 after operation of the activation function 206, are combined by networks 203 and 204 in a manner shortly to be described to generate signals 230 wherein, as seen in FIG. 4C for each frequency component and indicated by "$|I_1|+|Q_1|$" through "$|I_{32}|+|Q_{32}|$", there are values corresponding to the sums of the absolute values of the in-phase and quadrature components of the frequency components for a set of input signals 200. It is known that such sums approximate a Fourier transform and simulations show that this approximation is effective for target and clutter discrimination methods of the present invention subsequently described, these methods also being effective with a more precise Fourier transform. It is thus not necessary to provide the exact square root of the sum of the squares of in-phase and the quadrature portions of each frequency component involved in an exact Fourier transform and, typically, inconvenient to implement in real-time signal processing hardware such as the neural networks utilized in the present invention.

The positive portion signals 225 and 226 are received by networks 203 and 204 through buffers 231 through 234 shown in FIG. 4A, each buffer providing half of the inputs to one of the networks 203 or 204. Buffer 231 receives signals 225 and is clocked when network 202 is enabled; buffer 232 receives signals 225 and is clocked when network 201 is enabled; buffer 233 receives signals 226 and is clocked when network 202 is enabled; and buffer 234 receives signals 226 and is clocked when network 201 is enabled. Buffer 231 provides the positive portions of the inverted in-phase components to the lower half of the inputs of network 204 as indicated by "$+(-I_1)$" through "$+(-I_{32})$"; buffer 232 provides the positive portions of the normal in-phase components to the upper half of the inputs of network 204 as indicated by "$+(+I_1)$" through "$+(+I_{32})$"; buffer 233 provides the positive portions of the inverted quadature components the lower half of the inputs of network 203 as indicated by "$+(-Q_1)$" through "$+(-Q_{32})$"; and buffer 234 provides the positive portions of the normal quadrature components to the upper half of the inputs of network 204 as indicated by "$+(+Q_1)$" through "$+(+Q_{32})$". As a result, the combined networks 203 and 204 are, in effect and through activation function 206, provided with the first half output signals 215 from networks 201 and 202 as in-phase set of input signals and are provided with the second half output signals from networks 201 and 202 as a quadrature set of input signals.

The factors of the multiplying elements of the combined networks 203 and 204 corresponding to shaded areas 235 in FIG. 4A are selected for summing each one of the in-phase set 225 signals and each one of the quadrature set signals 226 corresponding to the same frequency component as a predetermined one of the signals 230. To provide this summing and as shown in FIG. 4C, the factors corresponding to the same component are set to the same non-zero value and the factors of the other multiplying elements corresponding to the one signal 230 are set to an effectively zero value. For example, signals "$+(+I_1)$", "$+(-I_1)$", "$+(+Q_1)$", and "$+(-Q_1)$" are associated with "1" factors in the FIG. 4C column associated with signal "$|I_1|+|Q_1|$" while the other factors of this column are "0". Each of the signals 230 thus represents the above discussed sum of the absolute values of the in-phase and the quadrature portions of the frequency component.

Since this sum, although positive since derived from signals subjected to activation function 206, may have the wide range typical of Fourier transform frequency components, signals 230 are provided to activation function 207 for a non-linear squashing operation before analysis shortly to be described to detect predetermined frequency characteristics present in the approximate Fourier transform spectrogram generated by the multiple network of FIG. 4A. A typical such operation is effected by selecting activation function 207, as described above, with generally logarithmical curved asymptotic portions 208 to generate output signals 250 which, sequentially and in effect, represent the discrete Fourier transform frequency values of successive spectra of a spectrogram of the combined target and clutter energy.

Distinguishing a Target by Spectral Width of Fourier Transform

Figure 5A:
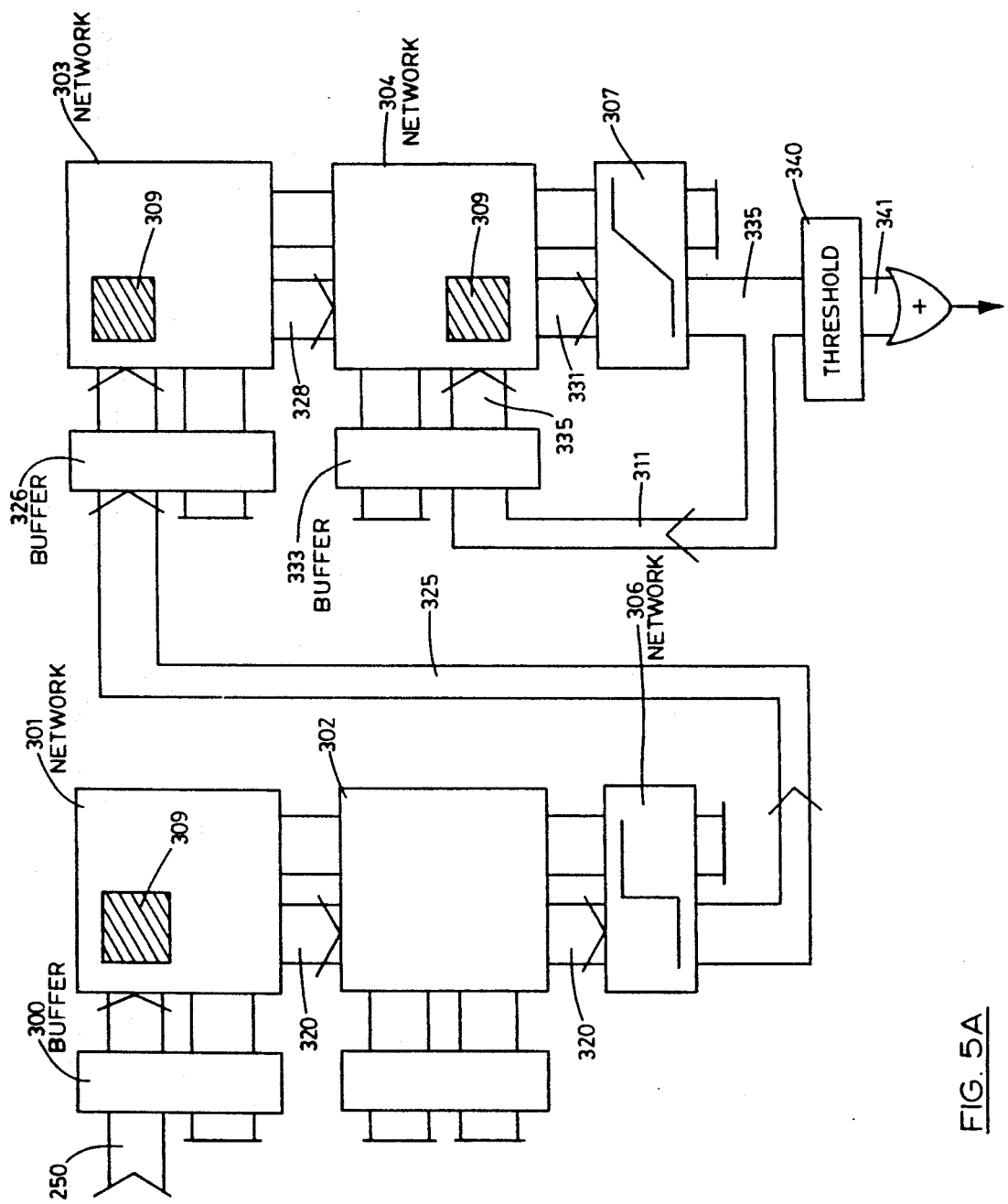
FIG. 5A is a diagram of a multiple artificial neural network utilizing a discrete Fourier transform and distinguishing a target in accordance with the first criterion.

FIG. 5A shows a multiple artificial neural network functioning in accordance with the present invention. This network continuously receives, as through a buffer 300, signals such as signals 250 generated by the FIG. 4A multiple network and representing frequency components of successive spectra of a spectrogram of combined target and clutter energy. The network distinguishes a target by the above-described first criteria that the target energy is present in a narrow range of frequencies. It is apparent that the FIG. 5A multiple network receives, as its input signals, the FIG. 4A multiple network output signals which represent the frequency components of the combined energy in the form of a discrete Fourier transform.

The FIG. 5A multiple network is like that of FIG. 4A in having a first network 301, a second network 302, a third network 303, and a fourth network 304 disposed in pairs. The first and second networks have a threshold or step activation function 306 like function 140 of FIG. 3A, and the third and fourth networks having an activation function 307 having a linear central portion like function 115 of FIG. 3A. Network 302 performs no function and thus is depicted without a shaded area, such as areas 309 in networks 301, 303, and 304, indicating multiplier factors selected to provide a predetermined function. Network 303, as indicated by numeral 311, utilizes feedback, typically in the manner indicated by numeral 18 in FIG. 1A.

Figures 5B, 5C:
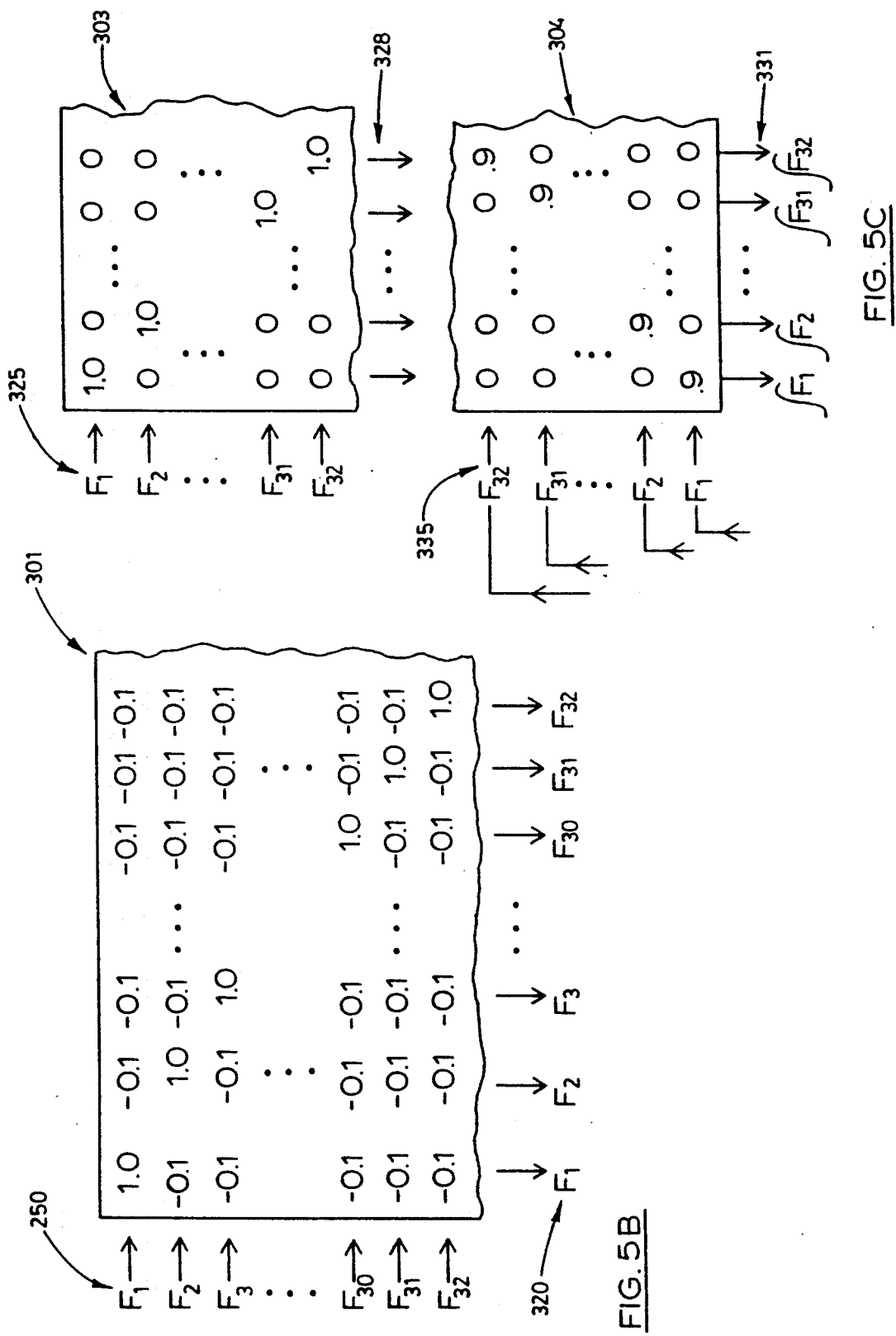
FIG. 5B and 5C are diagrams of typical factors used in the network of FIG. 5A.

Buffer 300 provides signals 250 as input signals to network 301, these signals being indicated by the vertical series of indicia "$F_1$" through "$F_{32}$" in FIG. 5B where output or sum signals 320 of network 301 are indicated by the horizontal series of indicia "$F_1$" through "$F_{32}$". The network 301 multiplying elements in area 309 receive signals 250 and are predetermined correlation coefficients shown in FIG. 3B and selected to correlate each frequency component of each spectrum represented by a set of signals 250 to provide, as one of the signals 320, a correlation value which is higher as the frequency component is higher and which is lower as the other frequency values are higher so as to detect, in the combined target and clutter energy, energy present in such a narrow range at the frequency corresponding to the frequency component.

To perform such a correlation, the factor corresponding, for example, to the column above the one output signal "$F_1$" and to the input signal "$F_1$" is "$-1.0$" while the other factors for this output signal are "$-0.1$" This correlation thus emphasizes the frequency characteristic of the combined energy being present in a narrow band corresponding to the frequency component of input signal "$F_1$" by "decorrelating" this signal as the energy of other frequency components increases. The factors for the other output signals 320 are similarly arranged with the factor for one input signal being 1.0 and the factors for the others being $-0.1$ so that the network 301 factors define correlation filters which correlate one of the frequency components with the negative of the other frequency components. The factors for each utilized multiplier element of network 301 are thus selected so that the factors corresponding to each output signal 320 select the emphasized frequency characteristic of the combined energy in the input signals 250.

The signals 320 are provided to threshold activation function 306 which is selected to generate suitable threshold values when the correlation values for each of the frequency components exceeds a predetermined level. Function 306 thus generates these threshold values so that they represent the frequency characteristic of the combined energy being present in a narrow band corresponding to a frequency component of the FIG. 4A input signal 200 in a different form than a discrete Fourier transform and for analysis by networks 303 and 304 to detect this characteristic. The threshold values are provided as signals 325 from function 306 to an input buffer 326 for network 303 where these signals are represented in FIG. 5C by the upper set of indicia "$F_1$" through "$F_{32}$". In network 303 a diagonally disposed set of multiplier factors are selected as "1.0" while the other factors of network 303 are effectively zero. As a result, signals 325 are provided, as indicated by numeral 328, to network 304. It is apparent that, because of the 1.0 factors, the threshold value signals 325 are unchanged when provided to network 304 which integrates these values for each frequency component to generate integrated values which are identified by numeral 331 and by "$fF_1$" through "$fF_{32}$" in FIG. 5C and which increase as the combined energy target and clutter energy persists in a each narrow range corresponding to one of the frequency components. Values 331 are provided to the, effectively, linear activation function 307 through which values 331 are output as indicated by numeral 335. Values 335 are fed back, as indicated by numeral 311, to network 304 through an input buffer 333 from which they are provided to network 304 as indicated in FIG. 5C by the lower set of indicia "$F_1$" through "$F_{32}$".

In the FIG. 5A multiple network and with the factors shown in FIG. 5C, networks 302 and 303 have no functions other than signal transmission. This is because of the paired network structure of the FIG. 1A network utilized in FIG. 5A and the need for different activation functions 306 and 307 for, respectively, thresholding and feed back. It is evident that the target distinguishing method provided by this multiple network may be performed by other network arrangements, as by two networks having separate activation functions or by a single network having outputs provided by different activation functions.

The integration function of network 304 is provided by selecting the multiplier factors thereof as shown in FIG. 5C with each factor, which corresponds to the one of the signals 331 and to the one of the signals 335 associated with the same frequency component, selected as an integration factor determining the number of successive threshold values from function 306 to identify persistence of energy at the frequency component corresponding to a target. The other factors corresponding to each of the signals 331 are selected to be effectively zero. Any suitable integration factor may be used for this purpose and may be varied in relation to the corresponding factor of network 303 to integrate successive such initial input signals over a predetermined plurality of sample signals, such as signals 200, of the combined energy. For example and in FIG. 5C, the network 304 factor corresponding to "$fF_{31}$" and to "$F_{31}$" is "0.9" while the other factors corresponding to "$fF_{31}$" are zero, factors of 0.9 in network 304 having been found effective in simulations and for the purposes of the present invention when used with the 1.0 factors of network 303.

It is evident that, in the integration function performed by the non-zero factors of networks 303 and 304, this function involves a variation of the frequency components during a predetermined plurality of said sample signals and that output signals 325 of combined networks 301 and 302 which typically are derived from output signals of the FIG. 4A multiple network and are in the form provided by function 306, are initial input signals to the combined networks 303 and 304 whose output signals 331 are also feedback input signals 335 to these combined networks. As a result, one of the combined network summing elements, which is not shown as before stated and which corresponds to a FIG. 1A element 25 and to an activation element 30 providing function 307, generates each one of the feedback signals. It is also evident that the factors of network 303 are selected to provide each of the signals 325 to a predetermined one of such summing elements of said second network. It is apparent that each factor of network 304 corresponding to one of the feedback signals and to the associated one of the summing elements is selected as a predetermined feedback factor to generate the feedback signal and to provide the feedback signal to the one summing element for summing with the signal initially provided thereto by the corresponding network 303 factor. Each feedback factor is also selected, as before stated, in relation to the corresponding network 303 factor so as to integrate successive input signals 325 over a predetermined plurality of sample signals such as signals 200.

The signals 335, which are substantially identical to the integrated values 331 and correspond to frequency components in the combined energy, are provided individually to any suitable threshold detectors, represented as a single block 340 in FIG. 5A, which generate for the signals 335 individual detection signals 341 when the integrated values attain a predetermined level representing target energy present in the combined energy at the corresponding frequency components. The detection signals are provided to an OR gate 341 which generates an output signal 345 for the FIG. 5A multiple network when this network determines, in accordance with the above-described first criteria, that the target energy is present in a narrow range of frequencies.

Distinguishing a Target by Amplitude Slope of Fourier Spectrogram

Figure 6A:
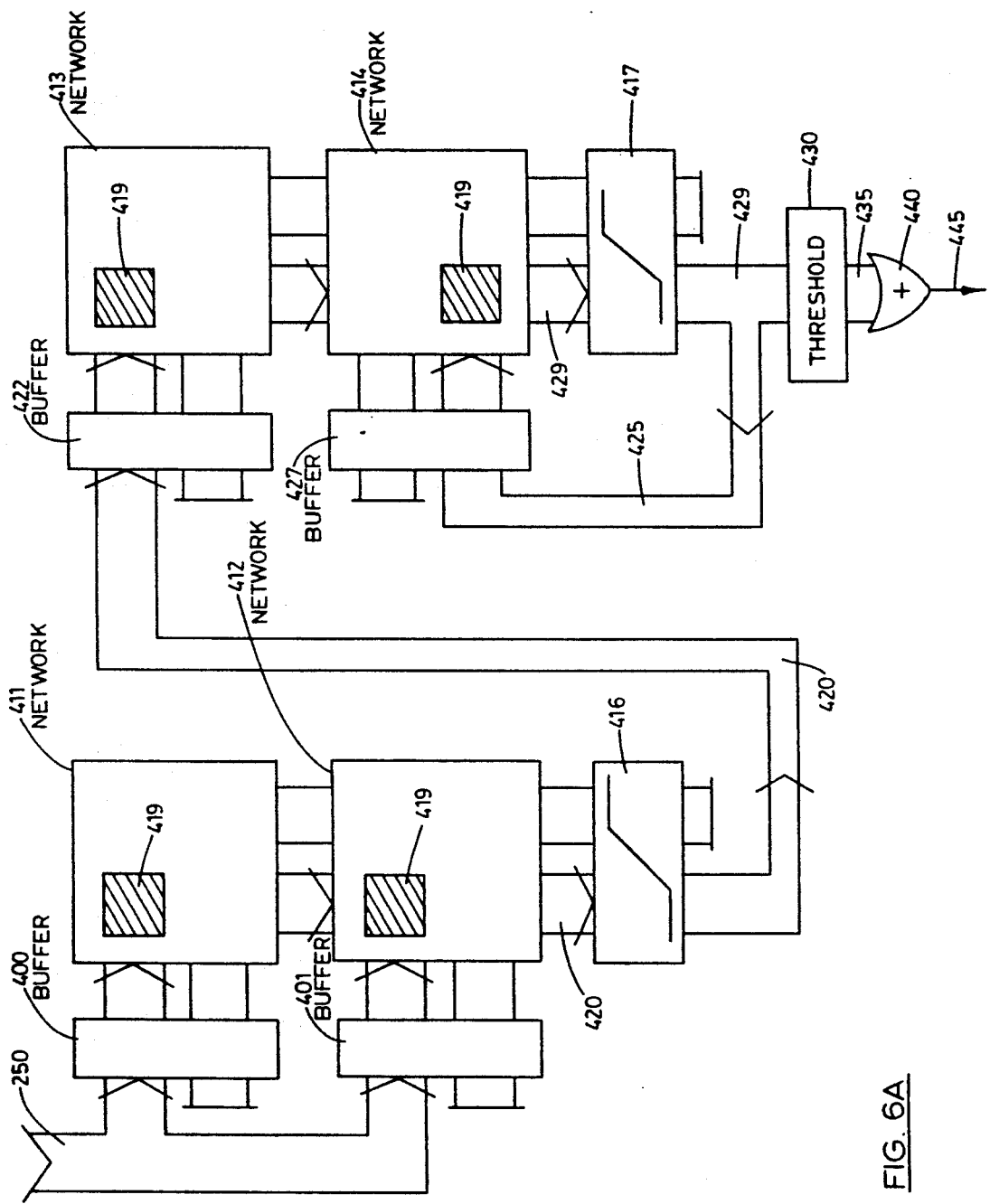
FIG. 6A is a diagram of a multiple artificial neural network utilizing a discrete Fourier transform and distinguishing a target in accordance with a second criterion of the present invention.

FIG. 6A shows a multiple artificial neural network functioning in accordance with the present invention by continuously receiving, through buffers 400 and 401, signals such as signals 250 generated by the FIG. 4A multiple network and representing frequency components of successive spectra of a spectrogram of combined target and clutter energy and by distinguishing a target by the above-described second criteria that the target energy be present in a narrow range of frequencies and increases over time.

The FIG. 6A multiple network is like that of FIG. 4A in having a first network 411, a second network 412, a third network 413, and a fourth network 414 disposed in pairs. The first and second networks have a an activation function 416 and the third and fourth networks having an activation function 417, functions 416 and 417 both having a linear central portion like function 115 of FIG. 3A. Networks 411-414 have shaded areas 419 indicating multiplier factors selected to provide predetermined functions.

Figures 6B, 6C:
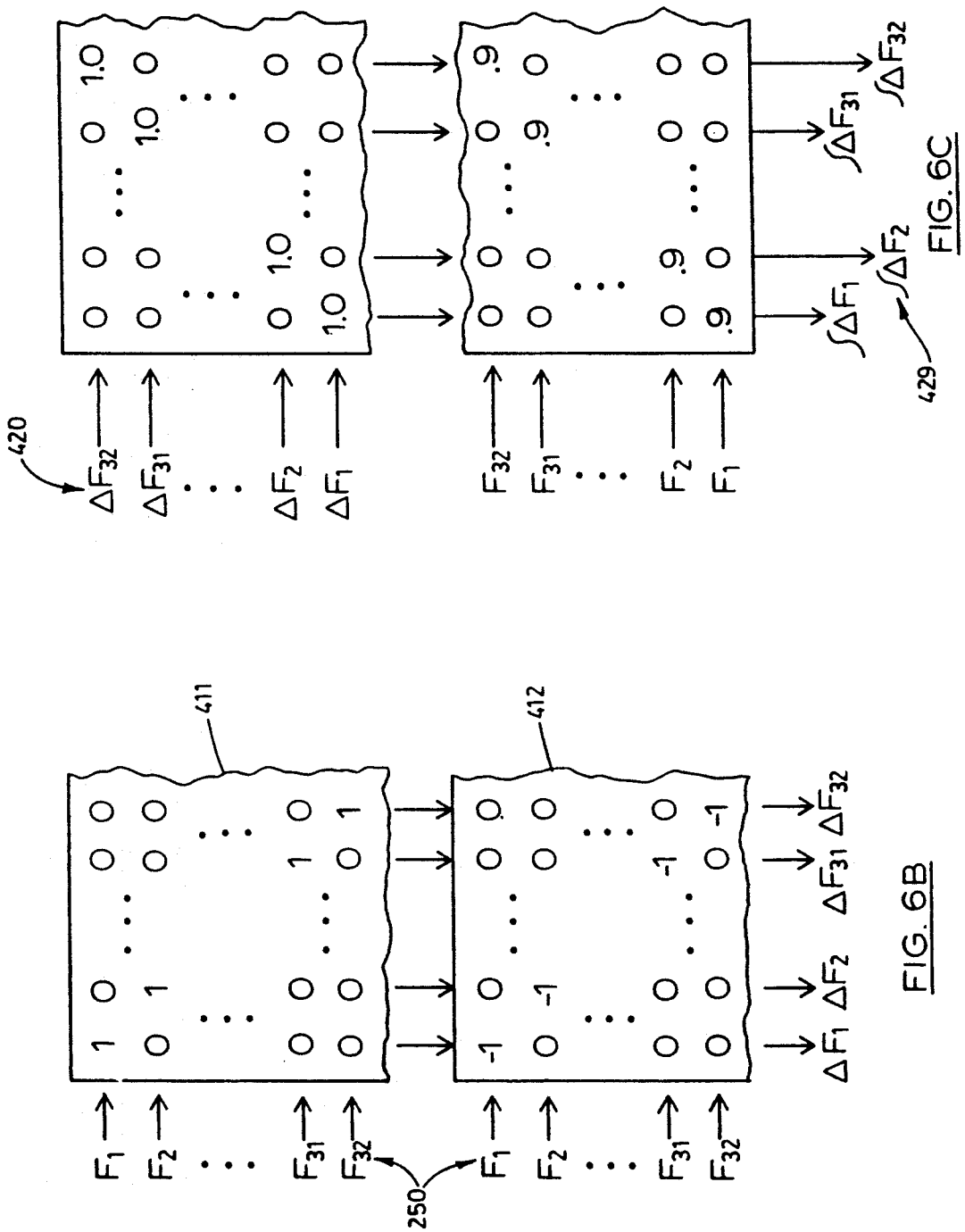
FIGS. 6B and 6C are diagrams of typical factors used in the network of FIG. 6A.

Buffer 401 provides signals 250 as input signals to network 411 and buffer 402 provides these signals also as input signals to network 412, these signals being indicated by the two sequences of indicia "$F_1$" through "$F_{32}$" in FIG. 6B where output or sum signals 420 of networks 411 and 412 are indicated by "$\Delta F_1$" through "$\Delta F_{32}$". Typically in the method of operating the FIG. 6A multiple network, buffer 401 is continuously clocked to receive a set of signals 250 representing the frequency components of one Fourier transform spectrum with buffer 400 being continuously clocked to receive the components of the next successive such spectrum provided in signals 250. It is seen in FIG. 6B that, in the effective multiplier factors of network 411, a diagonal set of the factors are "1" so as to provide the components of each such next spectrum for summing by the networks 411 and 412 summing elements, these elements being omitted as before stated but corresponding to FIG. 1 elements 25. In network 412 the corresponding diagonal set of the factors are "$-1$" and thus result in subtraction of the frequency values of the one spectrum from the corresponding components of the next spectrum. Signals 420 are thus difference values corresponding to the continuous changes in each frequency component of the combined energy, these difference values being positive as the energy of a component is increasing since the earlier spectra are subtracted from the later. Signals 420 are provided without significant change to an input buffer 422 for network 413 through linear activation function 416.

It is seen from FIG. 6C that network 413 has multiplier factors substantially identical to those of FIGS. 5A and 5C network 303, that network 414 has factors substantially identical to those of network 304, and that activation function 417 is linear as is function 307. It can be seen that from FIG. 6A that elements 413, 414, and 417 are connected for feedback, indicated by numeral 425, to an input buffer 427 of network 414 in the same way that elements 303, 304, and 307 are connected for feedback 311. As a result, function 417 continually generates integrated values 429 which are identified by "$fF_1$" through "$fF_{32}$" in FIG. 6C and which increase as the combined energy target and clutter energy continues to increase, rather than merely persists, in each of the frequency components of the Fourier transform signal 250.

The integrated value signals 429 are provided individually to any suitable threshold detector circuit 430, which corresponds to threshold block 340 in FIG. 5A and similarly generates detection signals 340 when the integrated values attain a predetermined level representing that the amplitude of target energy has a predetermined and continuing positive slope in frequency components of the combined energy. Similarly to FIG. 5A, in FIG. 6A the detection signals are provided to an OR gate 440 which generates an output signal 445 for the FIG. 6A multiple network when this network determines, in accordance with the above-described second criteria, that the target energy present in a narrow range of frequencies is increasing with time.

Distinguishing a Target by Absence of Frequency Motion in Fourier Spectrogram

Figure 7A:
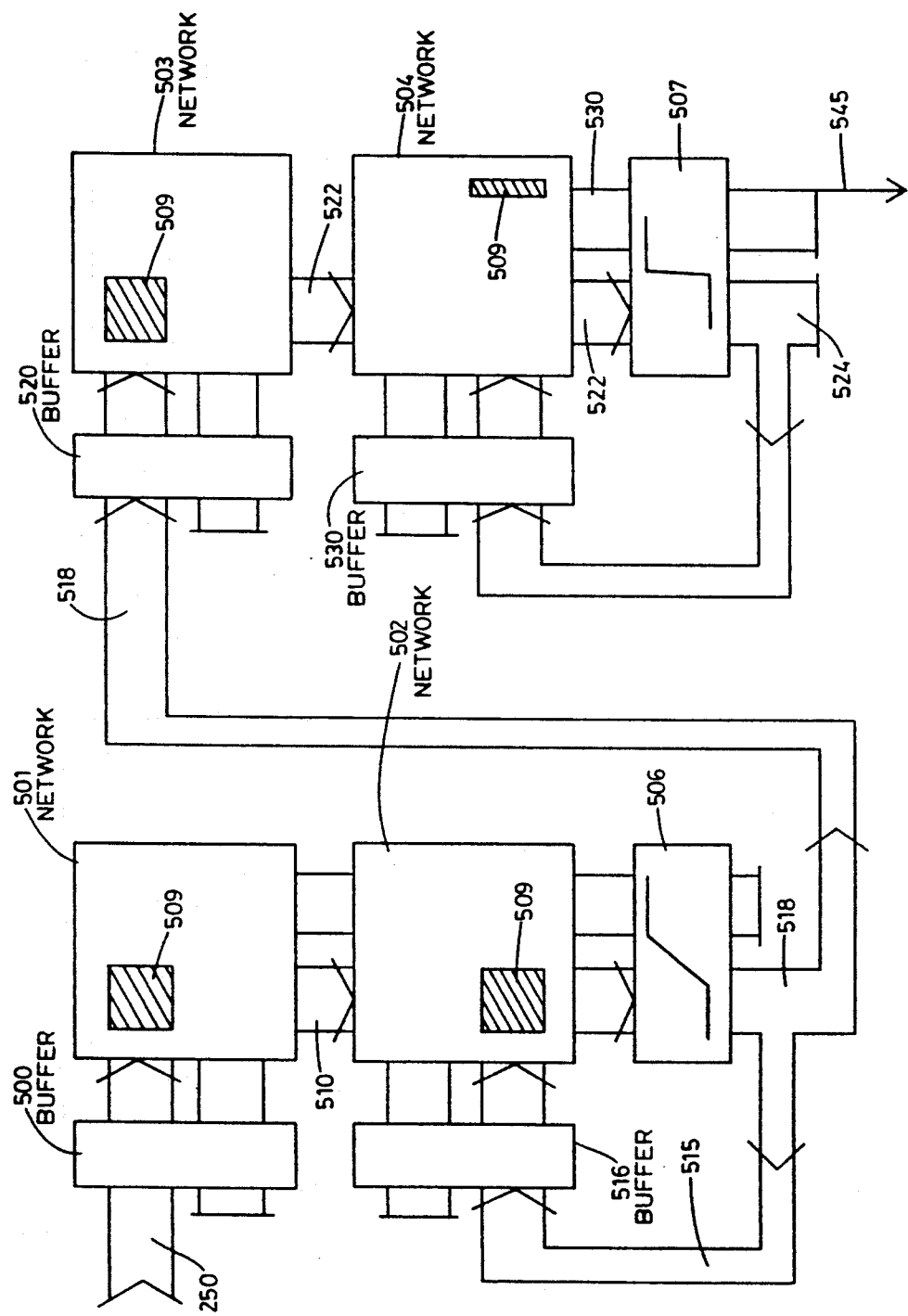
FIG. 7A is a diagram of a multiple artificial neural network utilizing a discrete Fourier transform and distinguishing a target in accordance with a third criterion of the present invention.

FIG. 7A shows a multiple artificial neural network operating in accordance with a method of the present invention by continuously receiving, through a buffer 500, signals such as signals 250 generated by the FIG. 4A multiple network and representing frequency components of successive spectra of a spectrogram of combined target and clutter energy and by distinguishing a target by the above-described third criteria that the target energy remains substantially a narrow range of frequencies over time.

The FIG. 7A multiple network is like that of FIG. 4A in having a first network 501, a second network 502, a third network 503, and a fourth network 504 disposed in pairs. The first and second networks have a linear activation function 506 like FIG. 3A function 115, and the third and fourth networks having a step activation function 507 like function 140. Networks 501-504 have shaded areas 509 indicating multiplier factors selected to provide predetermined functions.

Buffer 500 provides signals 250 as input signals to network 501, these signals being indicated by the upper set of indicia "$F_1$" through "$F_{32}$" in FIG. 7B wherein the multiplier factors for this network are seen to correspond to the correlation filter factors in FIG. 3D and thus, similarly, detect peak amplitudes at the center band of a group of three frequency components by emphasizing a peak amplitude at the center band.

The network 501 factors thus provide, for the signal 250 frequency components, correlation values 510 which are higher as the amplitude of the energy increases in a narrow range of frequencies including the frequency component. Correlation values 510 are provided through network 502 to activation function 506.

It is seen from FIG. 7B that network 502 has multiplier factors substantially identical to those of FIGS. 5A and 5C network 304 and that activation function 506 is linear as is function 307. It can be seen from FIG. 7A that elements 501, 502, and 506 are connected for feedback indicated by numeral 515 to an input buffer 516 of network 504 in the same way that elements 303, 304, and 307 are connected for feedback 311. The fed back signals are indicated in FIG. 7B by the lower set of indicia "$F_1$" through "$F_{32}$". Function 506 thus continually generates integrated values 518 which are identified by "$fF_1$" through "$fF_{32}$" in FIGS. 7B and 7C and which increase as combined target and clutter energy persists at the corresponding frequency component and which decrease as this energy shifts from the frequency component.

The integrated outputs 518 are provided through a buffer 520 to the multiplier factors of network 503 having output signals 522 identified by "$F_{32-30}$" through "$F_{1-31}$" in FIG. 7C wherein it seen that the three factors corresponding to each group of three integrated signals 518 and to each one of the output signals 522 of network 503 are "1" and the other factors corresponding to each of the output signals are effectively zero. Signals 522 are thus sum signals for each group of three adjacent frequency components and are provided through network 504 to threshold function 507 which provides output signals 524 when the integrated combined energy in each group of three combined frequency components persists in the group although not necessarily in one component thereof. Function 507 thus determines that the target energy present in a narrow range of frequency components remains in the range over time when any such sum signal exceeds a predetermined level.

The thresholded sum signals 524, which are identified by "$F_{32-30}$" through "$F_{1-31}$" in FIG. 7D are fed back to an input buffer 525 for network 504 wherein the multiplier factors are effectively zero except for one column which is indicated by shaded area 509 and in which the factors corresponding to each of the signals 524 is "1". These factors function as an OR gate to detect that the target energy, over time, has remained substantially in any one of a narrow range of frequencies each corresponding to one of the signals 250 frequency components. The output signal 530 from this column is again thresholded through function 507 to provide output signal 545 from the FIG. 7A multiple network.

It is evident that an AND gate, not shown, may be provided to receive the three output signals 345, 445, and 545 and generate a signal when all of these signals indicate that target energy is present in accordance with all three of criteria set forth above for distinguishing target energy from clutter energy and illustrated in FIG. 2.

Obviously, many modifications and variations of the present invention are possible in light of the above teachings. It is, therefore, to be understood that the present invention may be practiced within the scope of the following claims other than as described herein.

What is claimed is:

1. A method for discriminating between target wave energy and clutter wave energy, said target energy and said clutter energy being present in doppler frequencies of combined wave energy, and said target energy being characterized in relation to said clutter energy by at least one of the following criteria:
    a first criterion that said target energy is present in a narrow range of said frequencies of possible said doppler frequencies;
    a second criterion that said target energy in said range increases over time; and
    a third criterion that said target energy remains substantially in said range over time,
the method comprising:
    receiving said combined energy;
    generating time sequential frequency components of said combined wave energy; and
    analyzing said time sequential frequency components for frequencies corresponding to at least one of said criteria.

2. The method of claim 1 wherein said target energy is characterized by said first criterion, by said second criterion, and by said third criterion and wherein said analyzing comprises:
    generating a first signal when said target energy is present in such a narrow range of said frequencies of possible said doppler frequencies;
    generating a second signal when said target energy in said range increases over time;
    generating a third signal when said target energy remains substantially in said range over time; and
    determining that said target energy is present in said combined energy when said first signal, said second signal, and said third signal occur simultaneously.

3. The method of claim 1 wherein said generating comprises:
    providing a plurality of bandpass filters corresponding to different bands of possible said doppler frequencies in said combined energy, said filters having individual bipolar outputs representing the instantaneous amplitude of said combined energy in each of said bands; and
    sampling said outputs successively so that each sample of said outputs is one set of said time sequential frequency components.

4. The method of claim 3 wherein said analyzing comprises detecting said target energy present in such a narrow range of frequencies and at one of said bands by correlating the amplitude of the output corresponding to the one band and the amplitudes of the outputs corresponding to such bands adjacent to said one band by a correlation filter selected to emphasize a peak amplitude at the frequency of said one band.

5. The method of claim 3 wherein, at each of said samples:
    said generating comprises rectifying each of said outputs; and
    said analyzing comprises
    correlating the rectified output corresponding to each three adjacent said bands so as to detect peak amplitudes at the center bands of each of said three adjacent bands, and
    determining that said target energy is present in such a narrow range of frequencies in said combined energy when such a peak amplitude exceeds a predetermined threshold in each center band of a predetermined small number of adjacent such bands.

6. The method of claim 1 wherein said time sequential frequency components are generated as a spectrogram formed by said sequential frequency components, each spectrum of said spectrogram having frequency values corresponding to the amplitudes of energy present at different frequencies of said combined energy over a predetermined period of time.

7. The method of claim 6 wherein said frequency values of each spectrum of said time sequential spectra are generated by performing a discrete Fourier transform on said combined energy.

8. The method of claim 6 wherein said analyzing comprises detecting said target energy present in such a narrow range of frequencies by:
    correlating each frequency value of each spectrum of said spectrogram with a correlation filter selected to provide a correlation value which is higher as said frequency value is higher and which is lower as said other frequency values are higher so as to detect said combined energy present in such a narrow range at the frequency corresponding to said frequency value;
    generating a predetermined threshold value when said correlation value for any of said frequencies exceeds a predetermined level;
    integrating said threshold values for each frequency of said spectra to generate an integrated value increasing as said combined energy persists in such a narrow range; and
    determining that said target energy is present in such a narrow range of frequencies in said combined energy when said integrated value exceeds a predetermined level.

9. The method of claim 8 wherein said correlation filter correlates one of said frequency values of each spectrum with the negative of the other frequency values of the spectrum.

10. The method of claim 6 wherein said analyzing comprises detecting said target energy present in such a narrow range of frequencies and increasing over time by:

subtracting from each of said frequency values of each spectrum of said time sequential spectra the corresponding frequency value of a preceding spectrum so as to generate for each frequency of said spectra a difference value corresponding to a change in said combined energy at each frequency of said spectra;

integrating successive said difference values for each frequency of said spectra to generate an integrated value increasing as said combined energy increases in such a narrow range including the frequency; and determining that said target energy present in such a narrow range of frequencies is increasing when said integrated value exceeds a predetermined level.

11. The method of claim 6 wherein said analyzing comprises detecting said target energy present in such a narrow range of frequencies and remaining in said range over time, by:

correlating each frequency value of each spectrum of said spectrogram with a correlation filter selected to provide a correlation value which is higher as the amplitude of the frequency value is higher in a narrow range of said frequency values including the frequency corresponding to the frequency value;

integrating said correlation values for each frequency of said spectra to generate an integrated value for the frequency, said integrated value increasing as said combined energy persists in such a narrow range including the frequency;

summing said integrated values for each frequency in each of a plurality of predetermined bands of said frequencies of said combined energy to generate a sum value for the band, each of said bands corresponding to one of said frequencies and including the one frequency and a predetermined small number of adjacent said frequencies; and determining that said target energy present in such a narrow range of frequencies remains in said range over time when said sum value exceeds a predetermined level.

* * * * *